US008387090B2

(12) United States Patent
Collet et al.

(10) Patent No.: US 8,387,090 B2
(45) Date of Patent: Feb. 26, 2013

(54) METHOD AND SYSTEM FOR PROVIDING A REGIONAL CHANNEL IN A DIGITAL BROADCAST ENVIRONMENT

(75) Inventors: Jean-Luc Collet, La Guade (FR); Francois-Xavier Drouet, La Gaude (FR); Fabien Lanne, Valbonne (FR)

(73) Assignee: International Business Machines Corporation, Armonk, NY (US)

( * ) Notice: Subject to any disclaimer, the term of this patent is extended or adjusted under 35 U.S.C. 154(b) by 682 days.

(21) Appl. No.: 11/782,724

(22) Filed: Jul. 25, 2007

(65) Prior Publication Data

US 2008/0040755 A1 Feb. 14, 2008

(30) Foreign Application Priority Data

Aug. 9, 2006 (EP) ..................................... 06118686

(51) Int. Cl.
*H04N 7/16* (2011.01)
*H04N 7/173* (2011.01)
*H04N 5/445* (2011.01)
*G06F 3/00* (2006.01)
*G06F 13/00* (2006.01)
(52) U.S. Cl. ................ 725/38; 725/36; 725/93; 725/95; 725/97; 725/116; 725/118; 725/119; 725/135
(58) Field of Classification Search .................. None
See application file for complete search history.

(56) References Cited

U.S. PATENT DOCUMENTS

| 5,659,351 | A | * | 8/1997 | Huber ........................... 725/101 |
| 6,028,599 | A | * | 2/2000 | Yuen et al. ....................... 725/50 |
| 6,035,326 | A | | 3/2000 | Miles et al. |
| 6,047,162 | A | * | 4/2000 | Lazaris-Brunner et al. . 455/12.1 |
| 6,122,011 | A | * | 9/2000 | Dias et al. ...................... 348/569 |
| 6,505,236 | B1 | | 1/2003 | Pollack |
| 6,915,333 | B2 | | 7/2005 | Delia et al. |
| 6,937,616 | B1 | * | 8/2005 | Rezvani et al. ............... 370/466 |
| 7,606,327 | B2 | * | 10/2009 | Walker et al. ................. 375/316 |
| 2001/0025377 | A1 | * | 9/2001 | Hinderks ....................... 725/109 |
| 2005/0094812 | A1 | * | 5/2005 | Terekhova et al. ............ 380/201 |
| 2006/0259927 | A1 | * | 11/2006 | Acharya et al. ................. 725/61 |
| 2007/0107024 | A1 | * | 5/2007 | Versteeg et al. ................. 725/95 |
| 2007/0130393 | A1 | * | 6/2007 | Versteeg ......................... 710/57 |
| 2007/0242655 | A1 | * | 10/2007 | Li et al. ......................... 370/352 |

OTHER PUBLICATIONS

"ZipLip: Attachment Management R4", Copyright 1999-2004, ZipLip, Inc.

* cited by examiner

*Primary Examiner* — Nasser Goodarzi
*Assistant Examiner* — Mary A Kay
(74) *Attorney, Agent, or Firm* — Schmeiser, Olsen & Watts; John Pivnichny

(57) ABSTRACT

A method of delivering a regional television channel to a user over an Internet Protocol Television (IPTV) service comprising the steps of forming a multicast of channels intended for delivery to a user each channel having a specific channel slot, the multicast of channels including one or more regional channels corresponding to one of the multicast of channels; broadcasting the multicast channels to the user through a regional gateway; forming a regional channel control signal for scheduling and requesting broadcast of the at least one regional channel instead of the one of the multicast of channels; transmitting the regional channel control signal to the regional gateway; and in accordance with the regional channel control signal, at the required time, switching the regional gateway to the at least one regional channel instead of the corresponding one of the multicast channels such that the regional channel is in the specific channel slot of the corresponding channel.

14 Claims, 9 Drawing Sheets

| Channel Name | TF1 | TF2 | TF3 (Nat) | TF3 R1 | Tf3 R2 | TF3 R3 |
|---|---|---|---|---|---|---|
| Rx at DSLAM on Channel Number | 1 | 2 | 3 | 101 | 102 | 103 |
| Tx from DSLAM in R1 on channel number | 1 | 2 | 100 | 3 | 102 | 103 |

*Fig. 3*

| Location | DLSAM Identifier (IP Address) | Main Channel (IGMP Address) | Regional Channel (IGMP Address) | Start Session Time Duration Session | On Line Switch Status |
|---|---|---|---|---|---|
| Nice | @24.6.... | TF3@IP1 | TF3(Nice) @IP101 | -11h30 -20minutes | on/off |
| Strasbourg | @25.6.... | TF3@IP1 | TF3(Strasbourg) @IP102 | -11h30 -20minutes | on/off |

Fig. 5

| Main Channel (IGMP Address) | Regional Channel (IGMP Address) | Start Session Time Duration Session | On Line Switch Status |
|---|---|---|---|
| | | | |
| | | | |

602 — Main Channel (IGMP Address)
604 — Regional Channel (IGMP Address)
606 — Start Session Time Duration Session
608 — On Line Switch Status
600

Fig. 6

METHOD AND SYSTEM FOR PROVIDING A REGIONAL CHANNEL IN A DIGITAL BROADCAST ENVIRONMENT

FIELD OF THE INVENTION

This invention relates to a method and system for providing regional channels in a digital broadcasting environment, particularly but not exclusively in an Internet Protocol Television (IPTV) environment.

BACKGROUND OF THE INVENTION

The provision of a television service over internet protocol (IP) is known as IPTV and utilizes a protocol known as multicast. Multicast is a protocol to address a group of addresses in order to send data from one or more sources to a multitude of addresses. This means that only a single stream broadcast is required regardless of how many receivers the multicast is addressed to.

An example of a multicast transmission and reception system is shown in FIG. 1. The diagram shows the relative locations of HeadEnd Equipment 100, Middleware Equipment 102 and Customer Premise equipment 104. HeadEnd and Middleware Equipment 100 and 102 are connected to Customer Premise Equipment 104 by any appropriate network 106 which terminates at a digital subscriber line access multiplex (DSLAM) 108. The communication to Customer Premise Equipment is then effected via a PSTN link 110.

HeadEnd equipment 100 may include Encoders, Transcoders etc. and means (either via satellite, cable or any other appropriate manner) to broadcast the multicast that is produced. The multicast comprises a single stream for each of the different television channels that may be required to be transmitted to Customer Premise Equipment 104.

Middleware Equipment 102 is found at the internet service provider for example, may include video on demand (VOD), unicast capabilities, time shift TV, soft switching, voice over IP (VoIP) and Network Personal Video Recording (NPVR). Middleware Equipment 102 is responsible for providing services to Customer Premise Equipment 104 as described above.

Customer Premise Equipment 104 includes a Residential Gateway (GW) 112 that is connected to other equipment, including a PC 114, a telephone 116 and a Set Top Box 118. Set Top Box 118 is connected to a television monitor 120 and can provide television programs to both the television monitor and PC 114 and any other monitor in the Customer Premise Equipment 104.

Broadcasters will send the national television channels in their multicast. Regional channels may be introduced at locations closer to the user, for example at Middleware 102 or DSLAM 108. Regional channels are channels which are relevant for a particular region. In the past regional encoders and regional channel inputs have been used to provide regional television channels to the user (customer). The drawback with this approach is that additional encoders are required at the regional locations. In fact for each different region additional encoding and transmitting equipment is required. Alternatively additional equipment is required to feed a regional stream to a DSLAM to provide these regional channels. Again this requires additional equipment in each region. This also means that some if not all, of the controls of regional channels are managed regionally, which has both advantages and disadvantages.

One object of the present invention is to provide a regional television channel service and method in the IPTV environment which at least overcomes some of the drawbacks associated with the prior art.

Another object of the present invention is to provide a regional TV method and apparatus without additional equipment than that already existing.

SUMMARY OF THE INVENTION

The present invention is directed to the method and system for delivering a regional television channel to a user.

According to a first embodiment of the present invention, there is provided a method of delivering a regional television channel to a user over an Internet Protocol Television (IPTV) service comprising the steps of forming a multicast of channels intended for delivery to a user each channel having a specific channel slot, the multicast of channels including at least one regional channel corresponding to one of the multicast channels, broadcasting the multicast channels to the user through a regional gateway, forming a regional channel control signal for scheduling and requesting broadcast of the at least one regional channel instead of the corresponding one of the multicast channels, transmitting the regional channel control signal to the regional gateway, and in accordance with the regional channel control signal, at the required time, switching the regional gateway to the at least one regional channel instead of the corresponding one of the multicast channels such that the regional channel is in the specific channel slot of the corresponding one of the multicast channels.

According to a second embodiment of the present invention, there is provided a method of broadcasting a regional television channel to a user over an Internet Protocol Television (IPTV) service from a regional location comprising the steps of receiving a multicast of channels intended for delivery to a user each channel having a specific channel slot, the multicast of channels including at least one regional channel corresponding to one of the multicast channels, broadcasting the multicast channels to the user, receiving a regional channel control signal for scheduling and requesting broadcast of the at least one regional channel instead of the corresponding one of the multicast channels, in accordance with the regional channel control signal, at the required time, switching the regional gateway to the at least one regional channel instead of the corresponding one of the multicast channels such that the regional channel is in the specific channel slot of the corresponding one of the multicast channels.

According to a third embodiment of the present invention, there is provided a method of generating a control signal for controlling the broadcast of regional television channel to a user over an Internet Protocol Television (IPTV) service, wherein the service is in the form of a multicast of channels, each channel having a specific channel slot, the multicast of channels including at least one regional channel corresponding to one of the multicast channels and the channels being broadcast to a user through a regional gateway comprising the steps of forming a regional channel control signal for scheduling and requesting broadcast of the at least one regional channel instead of the corresponding one of the multicast channels, transmitting the regional channel control signal to the regional gateway, and wherein the regional channel control signal, at the required time, causes switching of the regional gateway to the at least one regional channel instead of the corresponding one of the multicast channels such that the regional channel is in the specific channel slot of the corresponding one of the multicast channels.

According to a fourth embodiment of the present invention, there is provided a system for delivering a regional television channel to a user over an Internet Protocol Television (IPTV) service comprising means for forming a multicast of channels intended for delivery to a user each channel having a specific channel slot, the multicast of channels including at least one regional channel corresponding to one of the multicast channels, means for broadcasting the multicast channels to the user through a regional gateway, means for forming a regional channel control signal for scheduling and requesting broadcast of the at least one regional channel instead of the corresponding one of the multicast channels, means for transmitting the regional channel control signal to the regional gateway, and in accordance with the regional channel control signal, at the required time, means for switching the regional gateway to the at least one regional channel instead of the corresponding one of the multicast channels such that the regional channel is in the specific channel slot of the corresponding one of the multicast channels.

According to a fifth embodiment of the present invention, there is provided a system for broadcasting a regional television channel to a user over an Internet Protocol Television (IPTV) service from a regional location comprising means for receiving a multicast of channels intended for delivery to a user each channel having a specific channel slot, the multicast of channels including at least one regional channel corresponding to one of the multicast channels, means for broadcasting the multicast channels to the user, means for receiving a regional channel control signal for scheduling and requesting broadcast of the at least one regional channel instead of the corresponding one of the multicast channels, in accordance with the regional channel control signal, at the required time, means for switching the regional gateway to the at least one regional channel instead of the corresponding one of the multicast channels such that the regional channel is in the specific channel slot of the corresponding one of the multicast channels.

According to a sixth embodiment of the present invention, there is provided a device for broadcasting a regional television channel to a user over an Internet Protocol Television (IPTV) service from a regional location comprising means for receiving a multicast of channels intended for delivery to a user each channel having a specific channel slot, the multicast of channels including at least one regional channel corresponding to one of the multicast channels, means for broadcasting the multicast channels to the user, means for receiving a regional channel control signal for scheduling and requesting broadcast of the at least one regional channel instead of the corresponding one of the multicast channels, in accordance with the regional channel control signal, at the required time, means for switching the regional gateway to the at least one regional channel instead of the corresponding one of the multicast channels such that the regional channel is in the specific channel slot of the corresponding one of the multicast channels.

According to a seventh embodiment of the present invention, there is provided a device for generating a control signal for controlling the broadcast of regional television channel to a user over an Internet Protocol Television (IPTV) service, wherein the service is in the form of a multicast of channels, each channel having a specific channel slot, the multicast of channels including at least one regional channel corresponding to one of the multicast channels and the channels being broadcast to a user through a regional gateway comprising means for forming a regional channel control signal for scheduling and requesting broadcast of the at least one regional channel instead of the corresponding one of the multicast channels, means for transmitting the regional channel control signal to the regional gateway, and wherein the regional channel control signal, at the required time, causes means for switching of the regional gateway to the at least one regional channel instead of the corresponding one of the multicast channels such that the regional channel is in the specific channel slot of the corresponding one of the multicast channels.

According to an eighth embodiment of the present invention, there is provided a computer program comprising instructions for delivering a regional television channel to a user over an Internet Protocol Television (IPTV) service when the program is executed on a computer comprising the steps of forming a multicast of channels intended for delivery to a user each channel having a specific channel slot, the multicast of channels including at least one regional channel corresponding to one of the multicast channels, broadcasting the multicast channels to the user through a regional gateway, forming a regional channel control signal for scheduling and requesting broadcast of the at least one regional channel instead of the corresponding one of the multicast channels, transmitting the regional channel control signal to the regional gateway, and in accordance with the regional channel control signal, at the required time, switching the regional gateway to the at least one regional channel instead of the corresponding one of the multicast channels such that the regional channel is in the specific channel slot of the corresponding one of the multicast channel.

Further embodiments of the invention are provided in the appended dependent claims.

The advantages of the present invention are that a new protocol exists between HeadEnd Equipment 100 and DSLAM 108 which enables all the broadcast channels to be provided from the HeadEnd Equipment and selection to be made on regional bases at Middleware Equipment 102. In addition, the user has the ability to select the regional channel the user would prefer to watch, for example, if this is not the user's local regional channel. Another advantage is that the present invention does not require additional hardware and instead reorganizes the channels (that are all transmitted from HeadEnd Equipment 100) in accordance to individual user needs.

BRIEF DESCRIPTION OF THE DRAWINGS

Reference will now be made by way of example to the accompanying drawings, in which

FIG. 3 is a table showing how the channels are changed for the present invention;

FIG. 5 is a table used at the HeadEnd Equipment in accordance with the present invention;

FIG. 6 is a table used at the DSLAM end of the equipment in accordance with the present invention;

DETAILED DESCRIPTION OF THE INVENTION

Figure 2:
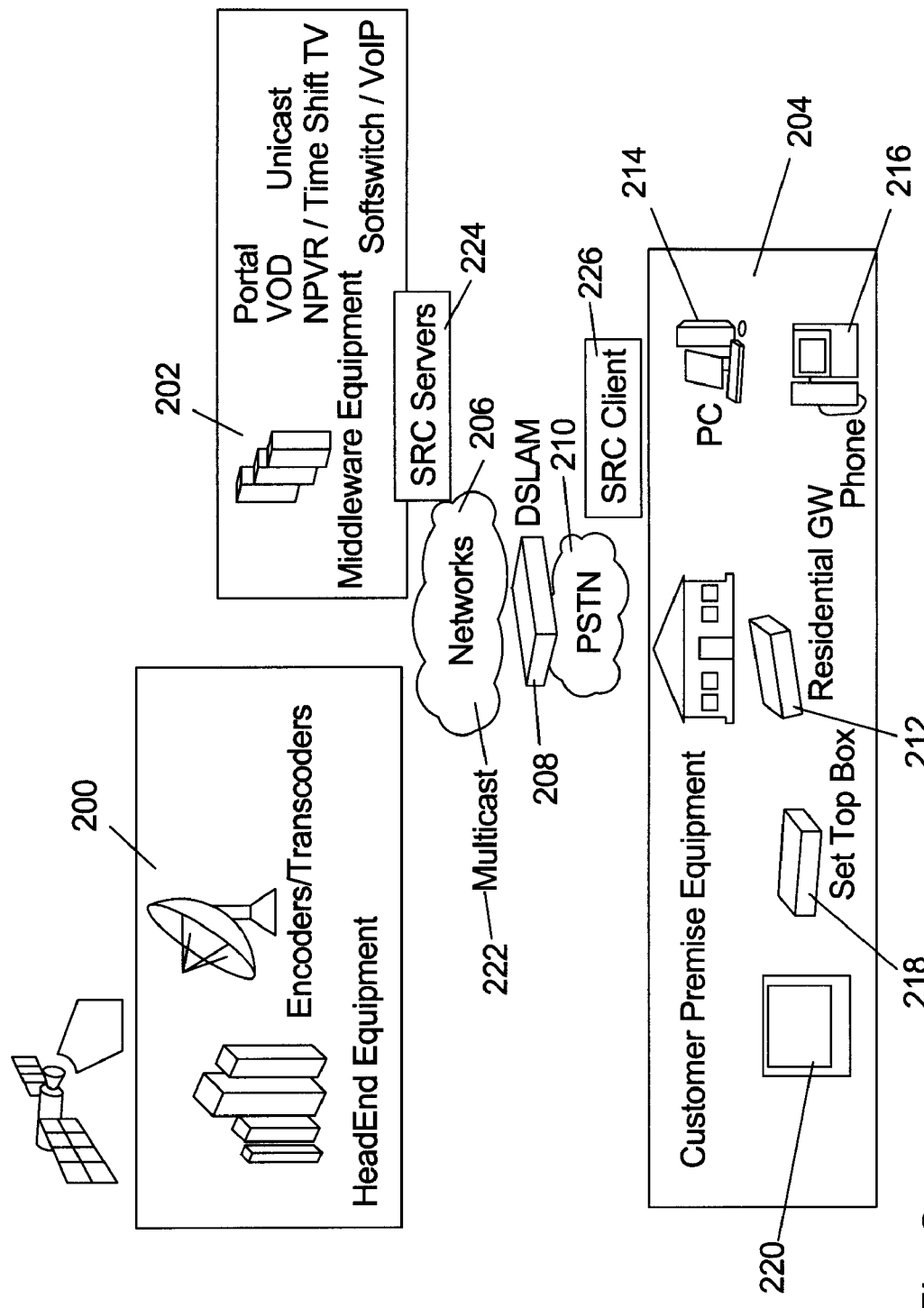
FIG. 2 is a IPTV system in accordance with the present invention.

FIG. 2 shows the IPTV system for delivery of regional television channels in accordance to the present invention.

Figure 1:
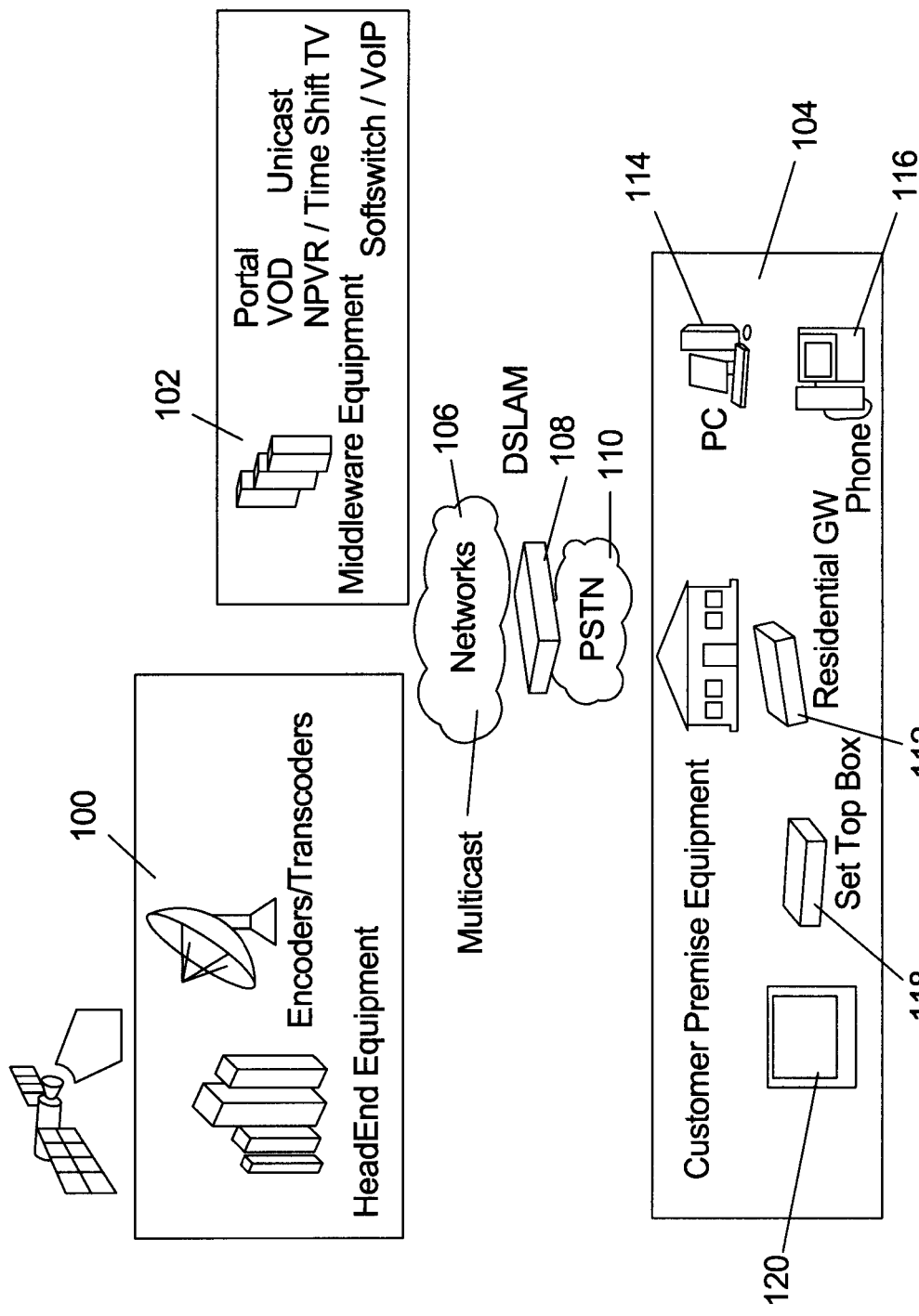
FIG. 1 is a block diagram of a general IPTV system.

Equivalent equipment is found at the HeadEnd 200, Middleware Equipment 202 and the Customer Premises End 204 similar to what was previously described with reference to FIG. 1. The HeadEnd Equipment 200 and Middleware Equipment 202 are connected via Networks 206, DSLAM 208 and PSTN connection 210 to the customer premises. As previously indicated Customer Premises Equipment 204 includes equipment such as PC 214, Phone 216, Set Top Box 218 and television monitor 220. In addition to the standard equipment of an IPTV system, the present invention includes two additional features which are used to adapt Multicast 222 transmitting from HeadEnd equipment 200. These two new additional elements are a Switch Regional Channel Server (SRC Server) 224 which is found in Middleware Equipment 202 and connects into Network 206; and a Switch Regional Channel Client (SRC Client) 226 found in DSLAM 208. The function of SRC Server 224 and SRC Client 226 will now be described in greater detail.

Multicast 222 broadcast from the HeadEnd Equipment 200 will include a plurality of channels. Each channel will generally have a name and a channel slot on which it is broadcast. For example in France the multicast will include a plurality of channels for example TF1, TF2, TF3 and many others. TF3 may have timeslots during which a regional version of TF3 may be broadcast. There may be a plurality of different regional TF3 channels for many different areas of France, for example region 1 may relate to Nice, region 2 may relate to Alsace and region 3 may relate to Toulouse.

At certain times the broadcaster may decide to switch from the national TF3 channel to broadcast a regional TF3 channel. This may be to provide regional advertising or regional programming as the case may be. For example there may be a number of regional football games and each regional area may wish to watch the regional game. Also advertisers may wish to target regional customers at specific times of the day, for example a pizza delivery company may wish to target regional customers an hour before lunch or dinner.

In accordance with the present invention, Multicast 222 broadcast from HeadEnd Equipment 200 may include not only the national channel of TF3, but also all possible regional channels for TF3 and any other channel where regional television may be anticipated or provided. Multicast 222 of multiple channels is broadcast and received at DSLAM 208 in any appropriate manner.

FIG. 3 shows a table 300 having a row showing Channel Names 302 and a row 304 showing the received Channel Number or slot on the DSLAM for the corresponding Channel Names. At the DSLAM if a regional channel is required to be broadcast to the end-users, the channel number for the regional channel is converted to replace the national channel number for the period of time over which the regional channel is to be transmitted. The new channel numbers or slots from the transmission end of the DSLAM are shown in row 306 of table 300. At a time when a regional broadcast is happening it can be seen that the new channel slot for TF3 national (NAT) has become 100 and the new channel slot for TF3 region 1 (R1) (the location of the user in question) is now channel 3. The regional channel has thus temporarily taken the slot of the national channel. This provides an advantage for the user that when a regional program is available, the user does not need to search for the right channel to view that regional program, instead the regional program replaces the normal national transmission for that particular channel. In the case of advertising, the user will be unaware of the fact that targeted and specific advertising material in the breaks between television programs is being received. This is because, certain advertising material may be sent at certain times in accordance with advertisers requirements for a particular region. As will be described in greater detail below there is also a record kept of the number of users at any time watching a specific channel to assist with the scheduling of regional advertising or regional television programs to a time when the maximum number of users are watching.

As previously mentioned, the manner in which the regional channel and the national channel are exchanged at specific periods of time are dependent upon a new protocol which is called the Switch Regional Channel Protocol (SRCP).

Figure 4:
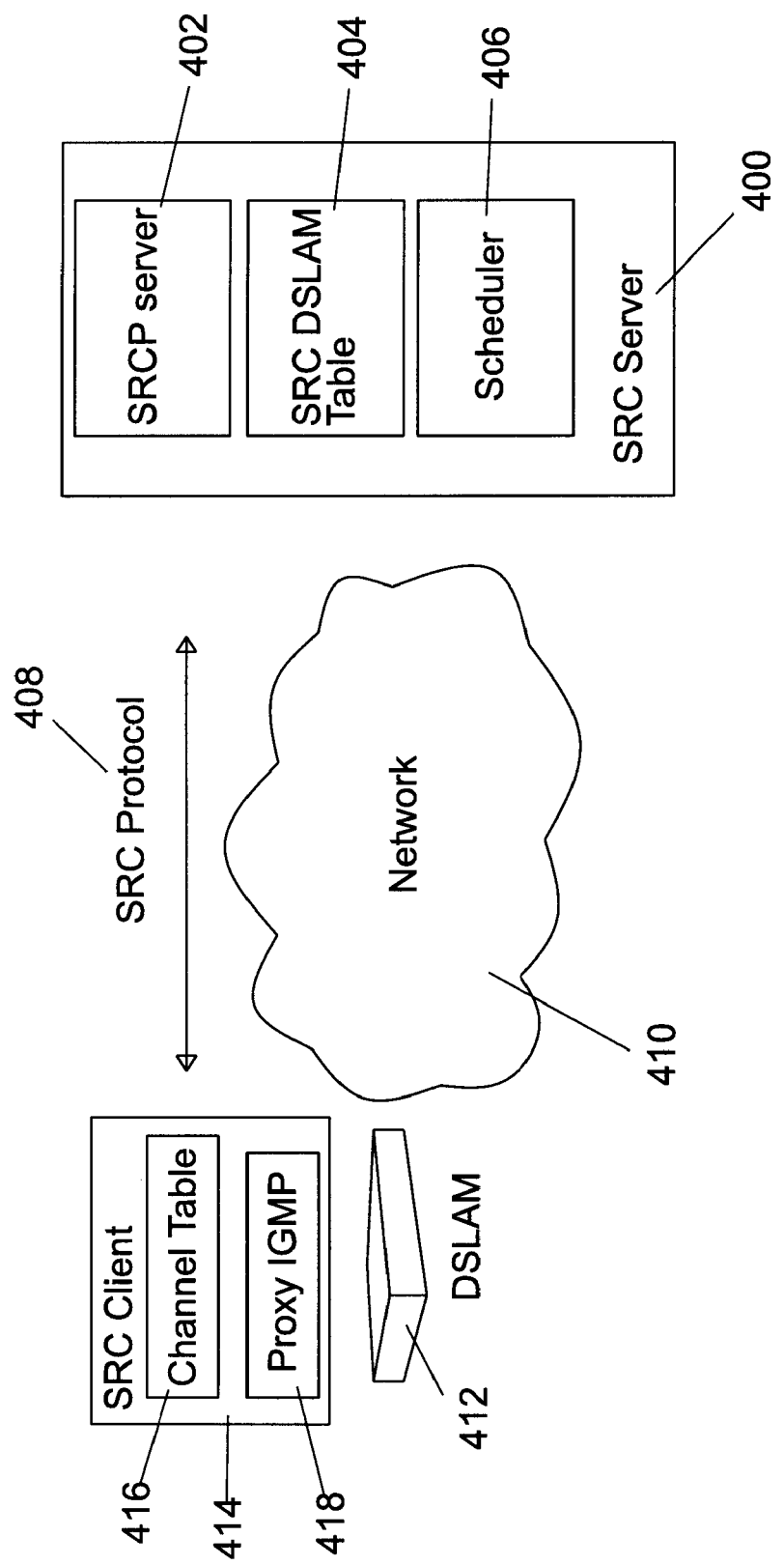
FIG. 4 is a block diagram showing details of a new protocol which exists in accordance with the present invention.

FIG. 4 shows in more detail how the SRCP operates and makes the changes illustrated above. SRC Server 224 of FIG. 2 is shown at the Middleware point in the system, however it could be found at different places, for example at the HeadEnd or at the DSLAM as is appropriate for various circumstances. SRC server 400 is shown in FIG. 4 and includes an SRCP server 402, an SRC DSLAM Table 404 and a Scheduler 406. SRC Server 400 sends and receives commands 408 over Network 410. Commands 408 in this instance are received by DSLAM 412. The DSLAM supports the SRC Client (previously identified in FIG. 2) 414. SRC Client 414 includes a Channel Table 416 and a Proxy Internet Group Management Protocol (IGMP) 418. The SRCP allows a central point to request DSLAM 412 to switch to regional channel (IGMP port) for a specific period of time for the end-user connected to a given national channel (for example TF3 as described above). As all the regional channels and national channels are multicast at all time on the network to DSLAM 412 from the HeadEnd Equipment it is at the DSLAM that the decision is made to which channel to communicate and onward broadcast to the user. This choice at DSLAM 412 is controlled by the SRCP. SRCP server 402 manages the protocol to control and demand when all requests should be sent to DSLAM 412. SRC DSLAM Table 404 includes all the information on how to switch a channel from one slot to another. The scheduler is composed of an agenda to launch the action per hour or day as appropriate.

Referring now to FIG. 5, SRC DSLAM Table 500 is shown in more detail. The table includes a number of columns. These columns include Location 502, DSLAM Identifier (IP Address) 504, Main Channel (IGMP Address) 506, Regional Channel (IGMP Address) 508, Start Session Time and Duration of Session 510 and On Line Switch Status 512. Table 500 has been completed for two locations, namely Nice 514 and Strasbourg 516 where the regional channel is TF3 Nice and Strasbourg respectively. The broadcaster wishes to transfer to the regional channel in each case at 11 h30 for a duration of twenty minutes. In each case the national TF3 channel is replaced with respective channel TF3 Nice and TF3 Strasbourg. The full details of all IP Addresses and IGMP Addresses are not shown but the nature and format of these will be understood by the persons skilled in the art. The table as previously indicated will be sent in the communication between the SRC server and SRC client. The table will be used by the DSLAM on receipt to transfer channel slot 3 on the DSLAM output from TF3 national to TF3 Nice or Strasbourg as appropriate at 11 h30 for twenty minutes. The on line switch status on/off will be set as appropriate depending on whether the regional channel is off or on.

Referring now to FIG. 6, SRC DSLAM client table 600 is shown. Table 600 includes a Main Channel (IGMP Address) 602, a Regional Channel (IGMP Address) 604; a Start Session Time and Duration Session 606 and again an On Line Switch Status 608. The content of this table will be made up in accordance with the content of the earlier presented SRC DSLAM tables as transmitted from the server.

Figure 7:
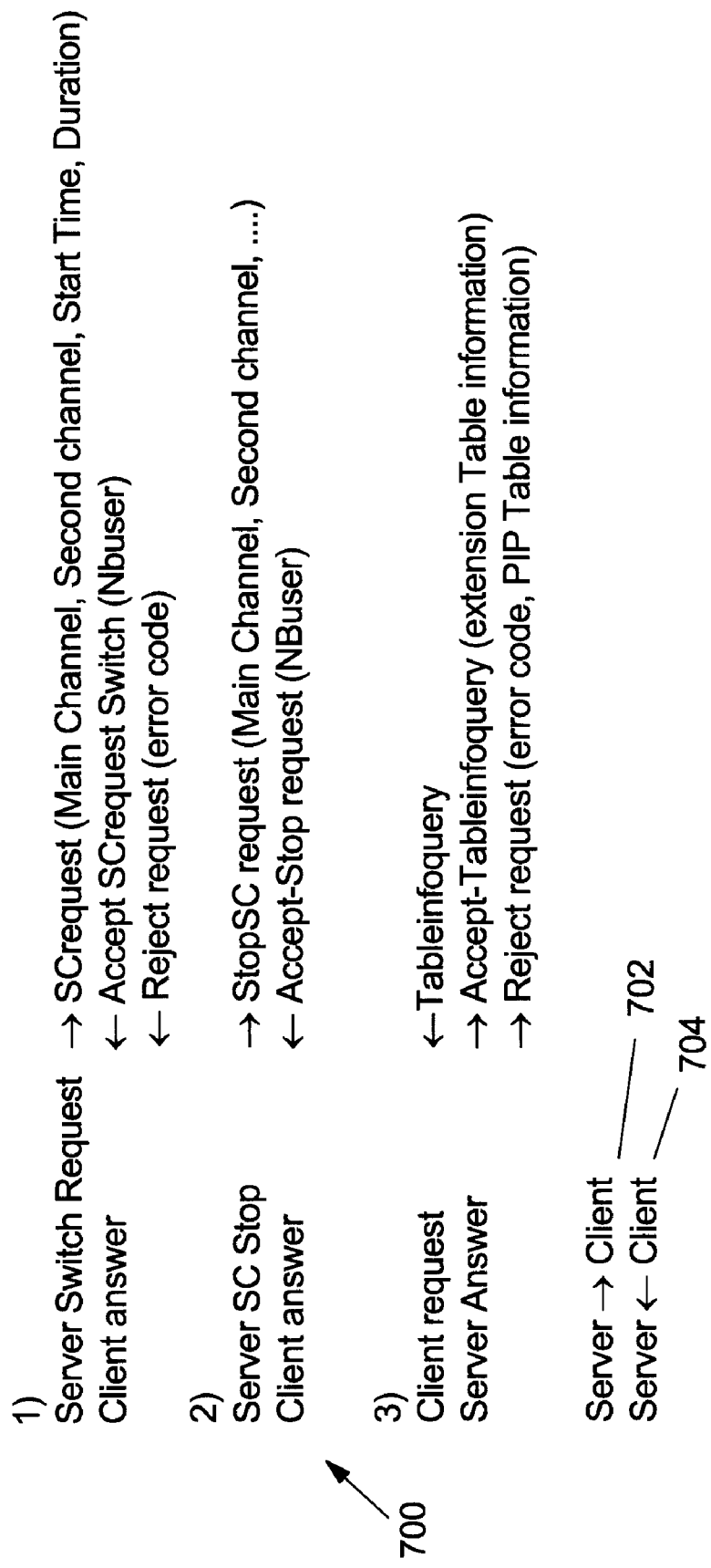
FIG. 7 is a diagram showing the protocol description in accordance with the present invention.

In order for the server and client to communicate effectively, the requests and answers as carried out in accordance with the SRC protocol are now described with reference to FIG. 7. The protocol is shown in general as 700. Reference Numeral 702 shows an arrow indicating a communication from Server to Client while the reference 704 shows an arrow indicating the direction of communication from Client to Server. The Server is the SRC Server and the Client is the DSLAM or SRC Client in the DSLAM. The protocol commences with the server switch request SCrequest. This request comprises the information related to Main Channel, Second channel, Start Time and Duration. The client answers with an Accept SCrequest Switch that indicates the number of users (Nbuser) or Rejects the request (error code). If the request is accepted and the number of users is below a certain threshold, the broadcaster may change the Switch Request to be a STOP Request which will be described in more detail below. As previously indicated, the number of users is used by the broadcaster to determine whether there are sufficient viewers to justify broadcasting certain information or advertisements or whatever.

If the SRC Server wishes to send a Stop request, the Stop request will be sent in the from of a StopSC request which will include the same details as in the SCrequest. A client answer will be Accept-Stop request and again indicates the number of users that apply.

As previously described there are possibilities that the user may require a different regional channel than the one usually available based on the user's region. For example the user in Nice may prefer to watch the regional channel of Strasbourg. In these instances the protocol uses the third identified description ((3) in FIG. 7). Here a Client request is sent to the Server subscribing to or requesting a different regional channel than that to which it would normally receive. This request is in the form of a Tableinfoquery. The server will then answer with an Accept-Tableinfoquery which will include the DSLAM Table extension information. In the alternative, the server may for some reason or another, reject the request and send an error code with the DSLAM Table extension information again.

Figure 8:
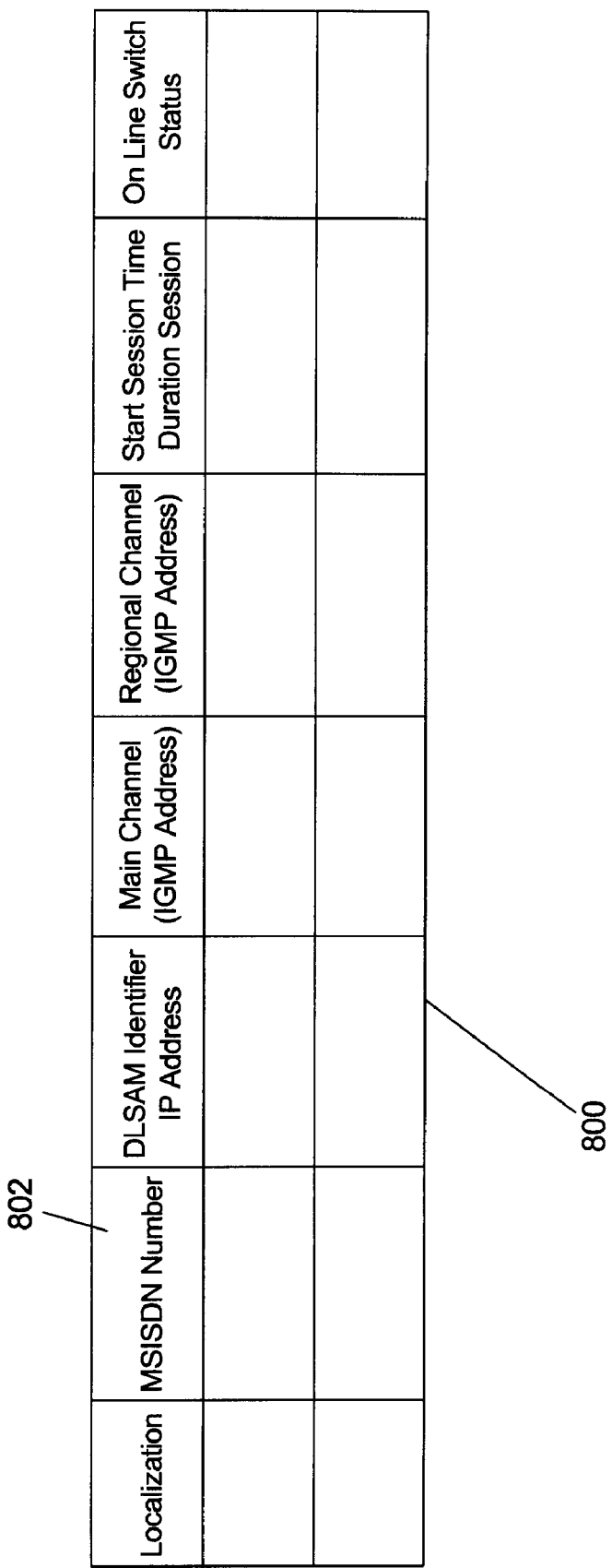
FIG. 8 is a table for extension of the service provided in accordance with the present invention.

The request from the user which is transmitted to the DSLAM may be made via any appropriate means for example the IP telephony link between the DSLAM and the user or any other appropriate means including e-mail, etc. Where such has been received at the Server, the SRC Server will generate an additional DSLAM Table extension 800 as is shown in FIG. 8. SRC DSLAM Table extension 800 and the SRC DSLAM Table (shown in FIG. 5) are identical with the exception of column 802. 802 the Mobile Subscriber ISDN Number (MSISDN Number) is included. This indicates the number on which the user has called to request a variation in the regional channel which is transmitted to it. This enables the DSLAM to send over the MSISDN Channel between the user and the DSLAM, the requested alternative regional channel in the form of a unicast as opposed to the multicast of all other channels. If a user makes a request for a change to the regional channel or an additional regional channel, the user may be charged for on an independent basis.

The result of the above system and method is that the user receives regional television over IPTV without the requirement of having separate encoders in regional locations. In addition, since the SRC DSLAM Tables are generated at the Middleware Equipment, the local provider can have some knowledge of the user requirement for the regional channel based on the number of users that is sent back from the DSLAM. This enables the Middleware ISP service providers to manage and control the advertising and programming provider to the user in order to maximize the number of users to which the relevant material is broadcast. This may be achieved by statistical analysis of the times at which the regional channel is generally watched. In addition, the provision of requests for the user for an alternative and/or additional regional channel means that people who are away from home or living in a new environment may still watch television programs that they enjoyed in the region from which they came.

Figure 9:
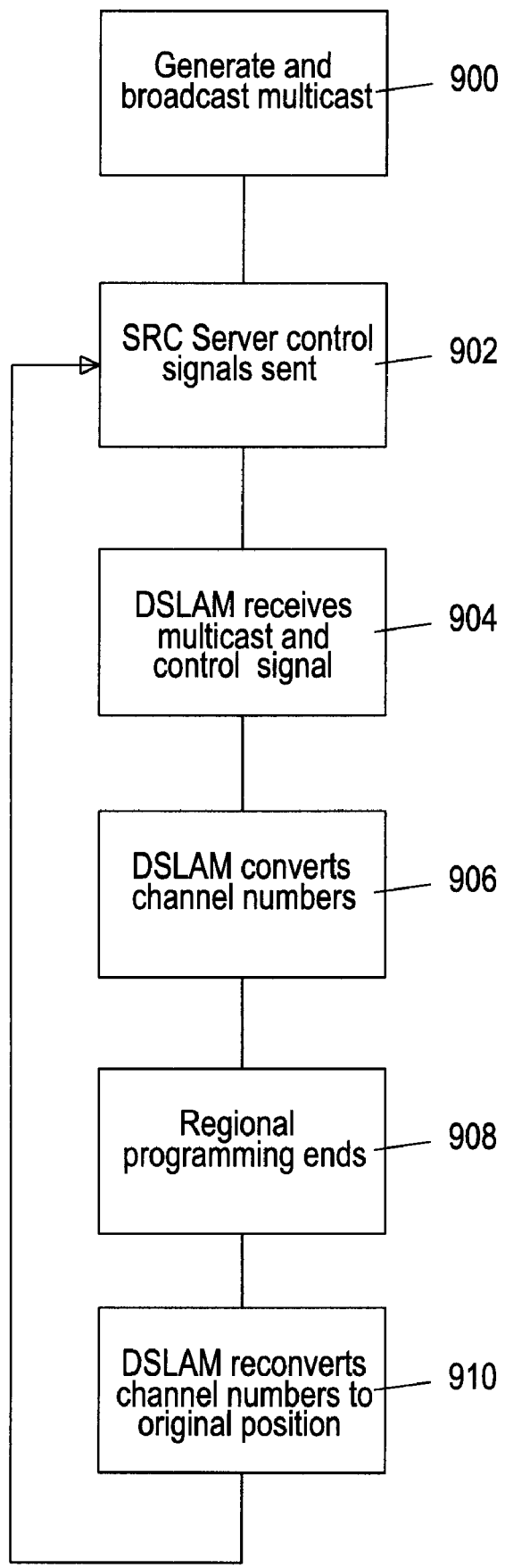
FIG. 9 is a block diagram of the method steps in accordance with the present invention.

Referring now to FIG. 9, the main steps carried out by the method of the invention are now described. In the first step 900, a multicast is generated and broadcast from the HeadEnd Equipment of the Broadcaster 900. Thereafter in step 902 the Middleware Equipment under the control of the ISP or other intermediary service provider generates an SRC Server control signal including the elements set out in FIG. 4. The remote DSLAM receives both the multicast and the control signal in step 904. The DSLAM then uses the control signal to convert channel numbers in accordance with FIG. 2 in step 906 so that the user is broadcast on the regional channel rather than the national channel. At a certain point in time at the end of the duration in the SRC DSLAM Tables, for example, the regional programming ends at step 908. The DSLAM reconverts channel numbers to their original position in step 910 so that the user will now view the national channel rather than the regional channel. The DSLAM then returns to the position of step 902 where it is a waiting the reception of an SRC server control signal. The regional programming may end at Step 908 due to the transmission of a Server SC Stop request as previously described.

The description has shown transmission of both the multicast and the control signals from the SRC Server to only one DSLAM. However, it would be appreciated that the same multicast and control signal could be sent to multiple DSLAM in the same region. In addition, both the middleware and the head end equipment could be located in the same place and be controlled by the same service providers. The service providers providing the services of both multicast and regionalisation could be any relevant body. The customer premise equipment set out in the figures and descriptions are shown only by way of example and may be replaced or augmented with any other equipment.

While the invention has been particularly shown and described with reference to a preferred embodiment, it will be understood that various changes inform and detail may be made therein without departing from the spirit, and scope of the invention.

What is claimed is:

1. A method of broadcasting a regional television channel to a user over an Internet Protocol Television (IPTV) service from a regional location, said method comprising:

a digital subscriber line access multiplex (DSLAM) receiving, from headend equipment at a headend via a network disposed between the headend equipment and the DSLAM, a broadcast of multicast channels intended for delivery to a user, said multicast channels including a plurality of national channels and a first regional channel, said multicast channels having been broadcast simultaneously from the headend being received simultaneously by the DSLAM;

said DSLAM broadcasting the multicast channels to the user;

said DSLAM receiving, from a Switch Regional Channel Server (SRC Server), a regional channel control signal specifying a broadcast during a specified first period of time of the first regional channel instead of a first national channel previously scheduled to be broadcast to the user during the specified first period of time; and in response to the regional channel control signal, said DSLAM switching the multicast channels broadcasted to the user during the specified first period of time from the first national channel to the first regional channel such that the first regional channel is in a specific channel slot of the first national channel during the specified first period of time during said broadcasting the multicast channels to the user, wherein broadcasting any channel means broadcasting television content on said any channel, wherein receiving a broadcast of said any channel means receiving a broadcast of said television content on said any channel, and wherein the SRC server is located at middleware equipment at an internet service provider, wherein the regional channel control signal is received by the DSLAM from the SRC server via the network, wherein the SRC server is located external to the headend equipment, and wherein the network is disposed between the SRC server and the DSLAM.

2. The method of claim 1, wherein the multicast channels include a second regional channel, and wherein the method further comprises:

said DSLAM receiving from the user a first request to broadcast to the user the second regional channel during a specified second period of time to replace the first regional channel that was previously scheduled to replace the first national channel to be broadcast to the user during the specified second period of time;

in response to said DSLAM receiving the first request, said DSLAM sending to the SRC server a second request requesting that the second regional channel be broadcast to the user during the specified second period of time; and after said sending the second request, said DSLAM receiving from the SRC server a return message comprising information for implementing the second request.

3. The method of claim 2, wherein the information in the return message comprises an identification of a Mobile Subscriber ISDN Number (MSISDN Number) on which the second regional channel is to be broadcast to the user during the specified second period of time, and wherein the method further comprises:

said DSLAM broadcasting the second regional channel to the user during the specified second period of time over a unicast channel corresponding to the MSISDN Number.

4. The method of claim 1, wherein the multicast channels include a plurality of regional channels that comprise the first regional channel, wherein the regional channel control signal comprises a SRC DSLAM table comprising rows and columns, wherein each row of the SRC DSLAM table corresponds to a different regional channel of the plurality of regional channels, and wherein the columns of the SRC DSLAM table comprise:

a location column identifying a location of each regional channel;

a DSLAM identifier column comprising an Internet Protocol (IP) address of the DSLAM;

a main channel identifier column comprising an Internet Group Management Protocol (IGMP) address of a main channel;

a regional address column comprising a regional channel IGMP address of each regional channel;

a time period column comprising a start time and a duration of a session for broadcasting each regional channel, wherein the time period column includes the specified first period of time during which the first regional channel is to be broadcast to the user instead of the first national channel; and an on line switch status column which indicates whether each regional channel is off or on.

5. The method of claim 4, wherein the columns of the SRC DSLAM table consist of the location column, the DSLAM identifier column, the main channel identifier column, the regional address column, the time period column, and the on line switch status column.

6. The method of claim 4, wherein the method further comprises:

said DSLAM generating a DSLAM client table by extracting from the SRC DSLAM table the main channel identifier column, the regional address column, the time period column, and the on line switch status column, and wherein the columns of the DSLAM client table comprise the main channel identifier column, the regional address column, the time period column, and the on line switch status column.

7. The method of claim 6, wherein the columns of the DSLAM client table consist of the main channel identifier column, the regional address column, the time period column, and the on line switch status column.

8. A system, comprising a digital subscriber line access multiplex (DSLAM), said DSLAM configured to implement a method of broadcasting a regional television channel to a user over an Internet Protocol Television (IPTV) service from a regional location, said method comprising:

said DSLAM receiving, from headend equipment at a headend via a network disposed between the headend equipment and the DSLAM, a broadcast of multicast channels intended for delivery to a user, said multicast channels including a plurality of national channels and a first regional channel, said multicast channels having been broadcast simultaneously from the headend being received simultaneously by the DSLAM;

said DSLAM broadcasting the multicast channels to the user;

said DSLAM receiving, from a Switch Regional Channel Server (SRC Server), a regional channel control signal specifying a broadcast during a specified first period of time of the first regional channel instead of a first national channel previously scheduled to be broadcast to the user during the specified first period of time; and in response to the regional channel control signal, said DSLAM switching the multicast channels broadcasted to the user during the specified first period of time from the first national channel to the first regional channel such that the first regional channel is in a specific channel slot of the first national channel during the specified first period of time during said broadcasting the multicast channels to the user, wherein broadcasting any channel means broadcasting television content on said any channel, wherein receiving a broadcast of said any channel means receiving a broadcast of said television content on said any channel, and wherein the SRC server is located at middleware equipment at an internet service provider, wherein the regional channel control signal is received by the DSLAM from the SRC server via the network, wherein the SRC server is located external to the headend equipment, and wherein the network is disposed between the SRC server and the DSLAM.

9. The system of claim 8, wherein the multicast channels include a second regional channel, and wherein the method further comprises:
said DSLAM receiving from the user a first request to broadcast to the user the second regional channel during a specified second period of time to replace the first regional channel that was previously scheduled to replace the first national channel to be broadcast to the user during the specified second period of time;
in response to said DSLAM receiving the first request, said DSLAM sending to the SRC server a second request requesting that the second regional channel be broadcast to the user during the specified second period of time; and
after said sending the second request, said DSLAM receiving from the SRC server a return message comprising information for implementing the second request.

10. The system of claim 9, wherein the information in the return message comprises an identification of a Mobile Subscriber ISDN Number (MSISDN Number) on which the second regional channel is to be broadcast to the user during the specified second period of time, and wherein the method further comprises:
said DSLAM broadcasting the second regional channel to the user during the specified second period of time over a unicast channel corresponding to the MSISDN Number.

11. The system of claim 8, wherein the multicast channels include a plurality of regional channels that comprise the first regional channel, wherein the regional channel control signal comprises a SRC DSLAM table comprising rows and columns, wherein each row of the SRC DSLAM table corresponds to a different regional channel of the plurality of regional channels, and wherein the columns of the SRC DSLAM table comprise:
a location column identifying a location of each regional channel;
a DSLAM identifier column comprising an Internet Protocol (IP) address of the DSLAM;
a main channel identifier column comprising an Internet Group Management Protocol (IGMP) address of a main channel;
a regional address column comprising a regional channel IGMP address of each regional channel;
a time period column comprising a start time and a duration of a session for broadcasting each regional channel, wherein the time period column includes the specified first period of time during which the first regional channel is to be broadcast to the user instead of the first national channel; and
an on line switch status column which indicates whether each regional channel is off or on.

12. The system of claim 11, wherein the columns of the SRC DSLAM table consist of the location column, the DSLAM identifier column, the main channel identifier column, the regional address column, the time period column, and the on line switch status column.

13. The system of claim 11, wherein the method further comprises:
said DSLAM generating a DSLAM client table by extracting from the SRC DSLAM table the main channel identifier column, the regional address column, the time period column, and the on line switch status column, and wherein the columns of the DSLAM client table comprise the main channel identifier column, the regional address column, the time period column, and the on line switch status column.

14. The system of claim 13, wherein the columns of the DSLAM client table consist of the main channel identifier column, the regional address column, the time period column, and the on line switch status column.

* * * * *